US006202053B1

United States Patent
Christiansen et al.

(10) Patent No.: US 6,202,053 B1
(45) Date of Patent: *Mar. 13, 2001

(54) METHOD AND APPARATUS FOR GENERATING SEGMENTATION SCORECARDS FOR EVALUATING CREDIT RISK OF BANK CARD APPLICANTS

(75) Inventors: James Christiansen, Chanhassen, MN (US); Sangita Fatnani, Hockessin, DE (US); Jayashree Santosh Kolhatkar, West Chester, PA (US); Krishnakumar Srinivasan, Hockessin, DE (US)

(73) Assignee: First USA Bank, NA, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,231

(22) Filed: Jan. 23, 1998

(51) Int. Cl.[7] ................................................ G06F 17/60
(52) U.S. Cl. ................................................ 705/38; 705/39
(58) Field of Search .......................................... 705/38, 39

(56) References Cited

U.S. PATENT DOCUMENTS

| 3,316,395 | 4/1967 | Lavin . |
| 4,774,664 | 9/1988 | Campbell et al. . |
| 4,866,634 | 9/1989 | Reboth et al. . |
| 5,111,395 | 5/1992 | Smith et al. . |
| 5,227,874 | 7/1993 | Von Kohorn . |
| 5,262,941 | 11/1993 | Saladin et al. . |
| 5,383,113 | 1/1995 | Kight et al. . |
| 5,550,734 | 8/1996 | Tarter et al. . |
| 5,583,778 | 12/1996 | Wind . |
| 5,592,590 | 1/1997 | Jolly . |
| 5,611,052 | * 3/1997 | Dykstra et al. .......................... 705/38 |
| 5,696,907 | 12/1997 | Tom . |
| 5,878,403 | * 3/1999 | DeFrancesco et al. ................. 705/38 |

FOREIGN PATENT DOCUMENTS

| 2257200 | 11/1972 | (DE) . |
| 404182868 | * 6/1992 | (JP) . |
| 406301706 | * 10/1994 | (JP) . |
| WO 009722073A | * 6/1992 | (WO) . |
| WO 009630850 | * 10/1996 | (WO) . |

OTHER PUBLICATIONS

Lewis, Edward. "An Introduction to Credit Scoring." Fair, Isaac and Co., Inc., 2nd ed., 1992, selected pages 30–37, 104–109, 114–121, and 156–157.*

Asch, Latimer. "How the RMA/Fair, Isaac credit-scoring model was built." Journal of Commercial Lending, v. 77, n. 10, pp. 10–16, Jun. 1995.*

Taylor, Claire et al. "Card issuers turn to scoring as they face increasing risk (bank card issuers consider risk factor in implementing applicant scoring for evaluating their accounts)." Financial Services Report, v. 8, n. 15, p. 1, Jul. 24, 1991.*

(List continued on next page.)

Primary Examiner—Eric W. Stamber
Assistant Examiner—Hani M. Kazimi
(74) Attorney, Agent, or Firm—Hunton & Williams

(57) ABSTRACT

The present invention is a method and apparatus that uses a plurality of predetermined segments to group credit applicants to evaluate each applicant's credit risk. The segments are based on at least one of reported trades, reported delinquency, bank card utilization, and length of said credit history. A score is generated for each applicant based on a unique scorecard designed for each segment The unique scorecards allow more accurate credit risk assessment by evaluating each applicant in view of that segment's tendency to be bad credit risks.

10 Claims, 8 Drawing Sheets

OTHER PUBLICATIONS

Hiremath, S. R. "Numerical credit scoring model." Bulletin of the Operations Research Society of America, v. 23, suppl. 1, p. B-75, Spring 1975.*

Roger, John C. et al. "A credit scoring model to evaluate the credit worthiness of credit card applicants." Developments in Marketing Science, v. 5, 1982.*

Hickman, Michael. "Using software to soften big-time competition." Bank Systems & Technology, v. 31, n. 8, pp. 38-40, Jun. 1994.*

Sullivan, Deidre. "Scoring borrower risk." Mortgage Banking, v. 55, n. 2, pp. 94-98, Nov. 1994.*

Jameson, Ron. "Expanding risk management strategies: key to future survival." Credit World, v. 84, n. 5, pp. 16-18, May 1996.*

Friedland, Marc. "Credit scoring digs deeper into data." Credit World, v. 84, n. 5, pp. 19-23, May 1996.*

"Credit scoring new markets." Bank Technology News, v. 9, n. 7, p. 1, Jul. 1996.*

Carey, James, J. "The sub-prime credit market: identifying good risks for unsecured cards." Credit World, v. 85, n. 1, pp. 13-15, Sep. 1996.*

"Opportunity knocks at scoring's door." Collection & Credit Risk, v. 2, n. 4, pp. 53-, Apr. 1997.*

Asch, Latimer. "Credit scoring: a strategic advance for small-business banking." Commercial Lending Review, v. 12, n. 2, pp. 18-22, Spring 1997.*

Quinn, J., "Credit Card Issuers Keeping A Closer Watch On How You Pay Bills," *The Washington Post,* Apr. 25, 1988, Business Section, p. 6.

Makuch, William, J., Managing Consumer Credit Delinquency in the US Economy: A Multi-Billion Dollar Management Science Application, *Interfaces* 22:1 Jan.-Feb. 1992 pp. 90-109.

* cited by examiner

| FINAL SEGMENTATION RESULTS (ON THE SAMPLED POPULATION). | | | |
|---|---|---|---|
| POPULATION | # GOOD 1 | # BAD | FACTORED ODDS |
| 1. THIN/NO BANKCARD | 11,532 | 7,329 | 15.7 |
| 2. THICK/CLEAN/UTILIZATION < 25% | 22,196 | 1,595 | 139.2 |
| 3. THICK/CLEAN/UTILIZATION < 70% | 15,623 | 3,729 | 41.9 |
| 4. THICK/CLEAN/OLD/UTILIZATION > 70% | 3,306 | 1,397 | 23.7 |
| 5. THICK/CLEAN/NEW/UTILIZATION > 70% | 2,095 | 1,723 | 12.2 |
| 6. THICK/DIRTY/UTILIZATION < 40% | 10,313 | 4,031 | 25.6 |
| 7. THICK/DIRTY/OLD/UTILIZATION > 40% | 4,615 | 3,531 | 13.1 |
| 8. THICK/DIRTY/NEW/UTILIZATION > 40% | 2,317 | 2,844 | 8.1 |
| TOTAL | 71,997 | 26,179 | 27.5 |

FIG. 4

| CREDIT BUREAU MATCH RATES. | | | |
|---|---|---|---|
| CATEGORY | SAMPLE SENT | SAMPLE MATCHED | MATCHED RATE |
| REJECTS | 135,332 | 128,550 | 95.0% |
| PURGED | 10,252 | 9,863 | 96.2% |
| BAD | 26,179 | 25,957 | 99.2% |
| INDETERMINATE 1 | 22,637 | 22,550 | 99.6% |
| INDETERMINATE 2 | 2,994 | 2,979 | 99.5% |
| GOOD 2 | 9,395 | 9,353 | 99.6% |
| GOOD 1 | 71,997 | 71,661 | 99.5% |
| TOTAL | 278,786 | 270,913 | 97.2% |

FIG. 5

METHOD AND APPARATUS FOR GENERATING SEGMENTATION SCORECARDS FOR EVALUATING CREDIT RISK OF BANK CARD APPLICANTS

FIELD OF THE INVENTION

The invention relates to a method and apparatus for assessing the credit risk of bank card applicants. Specifically, the method and apparatus relate to developing a segmentation tree to group bank card applicants into similar sub-populations and then building a custom scorecard for each of the sub-populations.

BACKGROUND OF THE INVENTION

Individuals seeking bank cards from a financial institution typically fill out applications providing information and requesting a bank card. Financial institutions lend credit to individuals based on the information provided in the applications and their credit history. The financial institution reviews the application provided by the applicant and reviews the applicant's credit history. The goal of the financial institution is to asses the credit risk of each individual bank card applicant so they will not extend credit to an individual that is a poor credit risk.

To assess the credit risk of each individual, the financial institution will develop a score for each applicant based on certain information. The applicant receives points for each item of information analyzed by the financial institution. The amount of points awarded for each item, the items actually analyzed, and the scores necessary for approval vary from financial institution to financial institution.

In today's market, financial institutions are approving more and more bank cards and are experiencing increased competition from other financial institutions for the applicants. Financial institutions would generally grant the applicant a bank card provided the applicant has an acceptable source of income and is not 120 days or more past due with another account.

The decision to approve or deny the applicant's request for a bank card was based on a scoring system. The financial institution scored each bank card applicant based on source and level of income as well as whether the applicant was ever 120 days past due. The scoring system used to evaluate each applicant and the minimum score required for approval was applied uniformly by a financial institution to all its applicants. Each institution had a single scorecard and approval score with which to assess the credit risk of all its bank card applicants. The problem faced by many financial institutions is that a significant number of bank card applicants approved become 90 days past due in the first two years or even declare bankruptcy. The financial institution is faced with the choice of increasing the score required for approval or closely monitoring the approved applicant's use of the bank card. Increasing the score would result in declining a large number of the applicants. This choice would cause a lot of the potential customers to be driven to the financial institution's competitors. Monitoring the approved applicant's use would require an increase in the cost to the financial institution for maintaining the bank card.

SUMMARY OF THE INVENTION

In accordance with a broad, general feature of this invention, a method for assessing credit risk and apparatus adapted for performing the method are provided. The method involves developing a segmentation tree, building a custom scorecard for each segment developed by the segmentation tree, grouping applicants into sub-populations corresponding to each segment, and applying the custom scorecard to the applicants within the corresponding segment.

The apparatus includes a central processor with a data bank into which data is written and from which data is read, a work station for processing applications, and a communications link for providing access to central processors outside the financial institution.

The method lowers the risk of a financial institution approving a poor risk application. By developing custom scorecards for different sub-populations of applicants, a financial institution is able to more accurately assess the credit risk of each applicant. A custom scorecard takes into account information that has been determined to be the most relevant for the applicants in that sub-population. This allows the financial institution to use a scorecard designed for a particular group of applicants based on that groups tendency to be a poor credit risk.

Use of an automated system to implement the generation of the custom scorecards and scoring the applications further lowers the cost to the financial institution of assessing credit risk. Automation of the credit risk assessment allows the financial institution to quickly, effectively, and inexpensively process a large number of applications. Automation also allows accurate assessment of each application generating reliable uniformity to the process. The method and apparatus lower the risk and cost to the financial institution in approving or denying bank card applications.

Other objects and features of the invention will become apparent as the description proceeds, especially when taken in conjunction with the accompanying drawings illustrating the invention, of which there are seven sheets and three embodiments.

BRIEF DESCRIPTION OF THE DRAWINGS

FIG. 4 is a table summarizing the sample results for a method utilizing eight segmentation groups according to one embodiment of the invention;

FIG. 5 is a table illustrating the credit bureau match rates for the sample analyzed according to one embodiment of the invention;

DETAILED DESCRIPTION OF PREFERRED EMBODIMENTS

All of the applicants who request bank cards are grouped into a total population. The total population is broken down into segments using a segmentation tree. The segmentation tree generates a plurality of segments into which similarly situated applicants can be grouped. Each segment of the segmentation tree defines a group based on information related to credit history. Sub-populations of the applicants are defined based on the segments generated by the segmentation tree.

Figure 1:
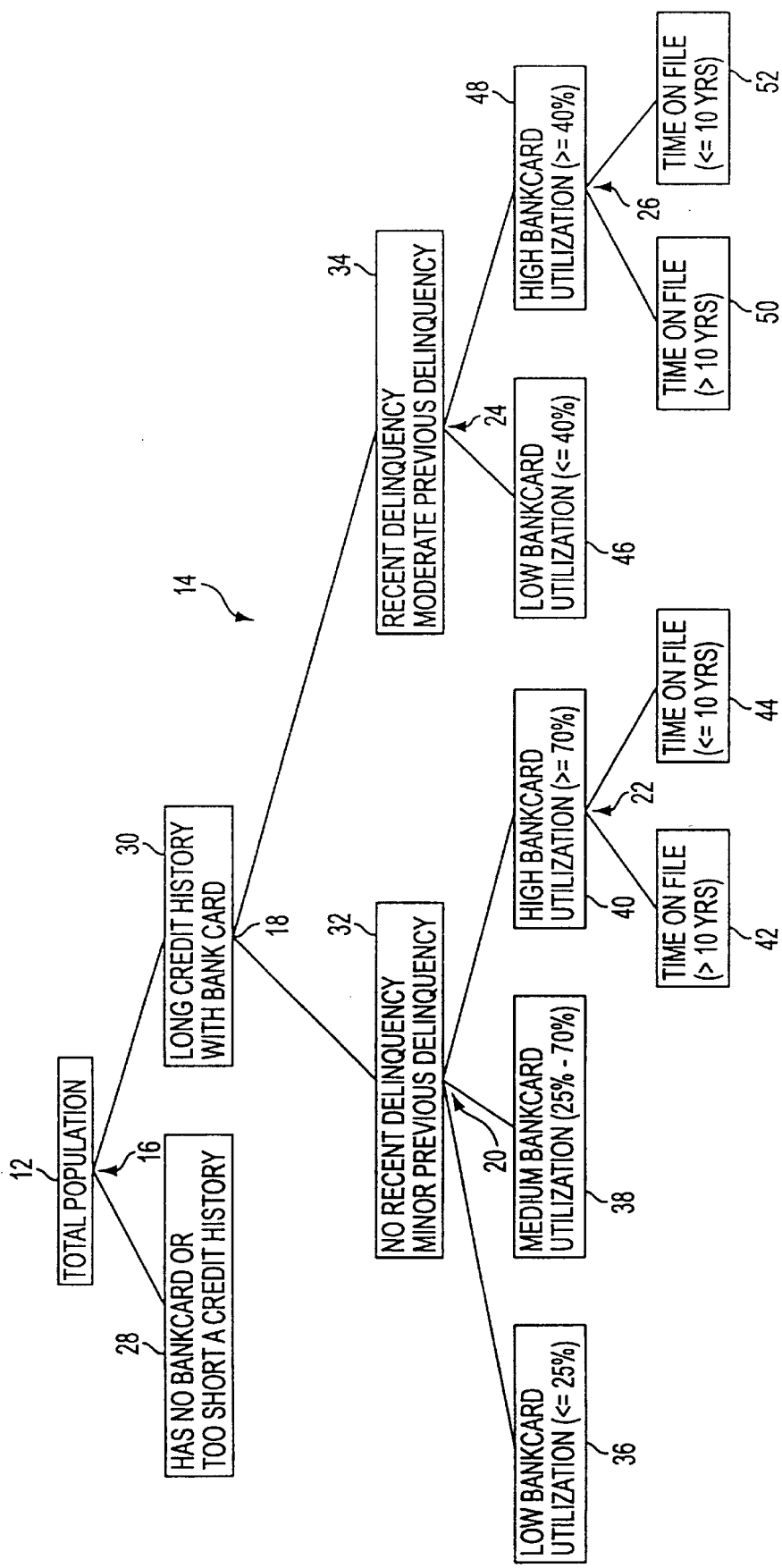
FIG. 1 illustrates a scorecard segmentation scheme according to one embodiment of the invention.

FIG. 1 illustrates a segmentation tree 14 according to one embodiment of the invention. The segmentation tree 14 breaks down a total population 12 into eight segments. The segments are generated based on four pieces of credit history information. The segmentation tree 14 includes a first branch 16, a second branch 18, a third branch 20, a fourth branch 22, a fifth branch 24, and a sixth branch 26.

The first branch 16 is developed using the amount of detail in the credit history. The first branch 16 creates two groupings, one group creates a first segment 28 and a second group 30 continues for further segmentation. The first segment 28 defines a sub-population that has a thin credit file. A thin credit file encompasses credit histories of people that have not had a bank card or too short of a credit history. An applicant with a thin file generally refers to an applicant with fewer than three trades. The group 30 includes credit histories with thick credit files. Thick credit files means the history has data on three or more trades.

The second branch 18 further segments group 30. The second branch 18 is developed using the delinquency reported in the credit history. The second branch 18 creates two groupings 32 and 34 which are segmented further by the segmentation tree 14. The group 32 includes credit histories with no recent delinquencies and only minor delinquencies in the entire history. Minor delinquencies are where the account was not 60 or more days delinquent. Recent delinquencies are ones that occurred within the last six months. The group 34 includes credit histories with recent and/or severe delinquencies. Applicants with no delinquencies or very old minor delinquencies are generally refereed to as having a clean credit history. Those with moderate or severe and recent delinquencies are generally referred to as having a dirty credit history. The severity index used to determine whether a credit history is clean or dirty is taken as a combination of severity and recentness of the delinquency. In one embodiment, a clean credit history would have a severity index value smaller than four.

The third branch 20 further segments group 32. The third branch 20 is developed using the bank card utilization reported in the credit history. The third branch 20 creates three groupings, one group defines a second segment 36, one group defines a third segment 38 and the last defines a group 40 which is segmented further. The second segment 36 defines a sub-population having credit histories with low bank card utilization. Bank card utilization is a percentage of the ratio of balance to limit on revolving and national trades. Low utilization for the second segment 36 is a utilization of 25% or less. The third segment 38 defines a sub-population having credit histories with medium bank card utilization. The medium utilization of the third segment 38 is a utilization of 25% to 70%. The group 40 includes credit histories with high bank card utilization of at least 70%.

The fourth branch 22 further segments group 40. The fourth branch 22 is developed using the time span of the credit history. The fourth branch 22 creates a fourth segment 42 and a fifth segment 44. The fourth segment 42 defines a sub-population having credit histories going back more than ten years. The fifth segment 44 defines a sub-population having credit histories going back ten years or less. Applicants with credit histories that span more than ten years are generally referred to as having old credit histories and applicants with credit histories spanning ten years or less are generally referred to as having new credit histories.

The fifth branch 24 further segments group 34. The fifth branch 24 is developed using the bank card utilization reported in the credit history. The fifth branch 24 creates a sixth segment 46 and a group 48 which is segmented further. The sixth segment 46 defines a sub-population having credit histories with low bank card utilization of 40% or less. The group 48 includes credit histories with bank card utilization of greater than 40%.

The sixth branch 26 further segments group 48. The sixth branch 26 is developed using the time span of the credit histories. The sixth branch 26 creates a seventh segment 50 and an eighth segment 52. The seventh segment 50 defines a sub-population having old credit histories spanning more than ten years. The eighth segment 52 defines a sub-population having new credit histories spanning ten years or less.

Figure 2:
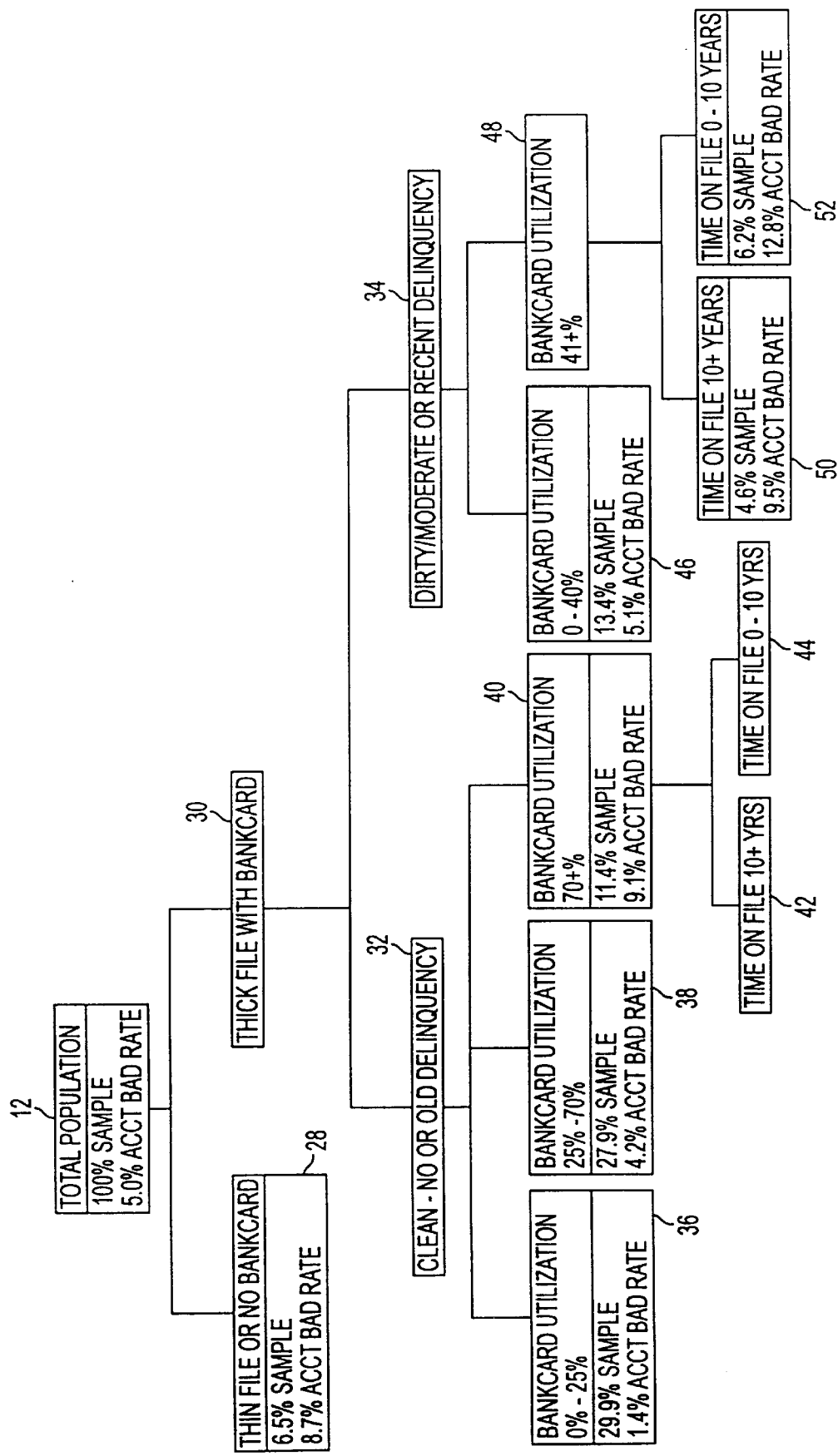
FIG. 2 illustrates a segmentation scheme according to one embodiment of the invention with sub-population groupings for a representative sample.

A separate scorecard is developed for each of the eight segments defined by the segmentation tree 14. Each scorecard can be developed to accurately score similarly situated applicants in each of the eight defined sub-populations. As can be seen in FIG. 2, each of the defined sub-populations has a different bad account percentage. In addition, the criteria indicating whether an account is likely to become bad varies from sub-population to sub-population.

In order to test the validity of the defined sub-populations, a representative sample of past applicants were rescored with the new methodology and compared with their actual credit history. The goal was to estimate the probability that an account would be 90 or more days past due in the first two years. Bad accounts were defined as accounts that were 90 or more days past due and the rest were termed good. FIG. 2 shows the breakdown of the percentage of the sample with the percentage of accounts for each of the eight segments developed using the segmentation 14.

The total population 12 included 100 percent of the representative sample and had a five percent bad account rate. The first segment 28 included the portion of the sample that had thin credit files or no bankcards. This represented 6.5 percent of the total sample and the sub-population defined by the segment 28 had a 6.7 percent bad account rate. The rest of the total population 12 with thick credit files including bankcards were placed in the group 30. Those in group 30 were split next into the two groups 32 and 34. This split was based on the severity and recentness of any delinquencies. Group 32 included those applicants in the sample with thick credit files and no or old delinquencies (clean) in their file history. The group 32 included portions of the sample with thick credit files and moderate or recent delinquencies (dirty). The portion of the total population 12 that fit into group 32 were further split based on bankcard utilization. The second segment 36 defined a sub-population of the sample with thick, clean credit files where the bankcard utilization was 25 percent or less. The sub-population defined by the second segment 36 included 29.9 percent of the representative sample and had a 1.4 percent bad account rate. The third segment 38 defined a sub-population with thick, clean credit histories and a bankcard utilization of 25 to 70 percent. The sub-population defined by the third segment 38 included 27.9 percent of the sample and had a 4.2 percent bad account rate.

The group 40 included portions of the total population 12 with thick, clean credit histories and a bank utilization of more than 70 percent. The group 40 included 11.4 percent of the representative sample and had a 9.1 percent bad account rate. Based on the high rate, the group 40 was further segmented into the fourth segment 42 and the fifth segment 44 based on the time span of the credit history. The old credit histories (more than 10 years) where grouped in the fourth segment 42 and the new credit histories (10 years or less reported) where grouped in the fifth segment 44.

The group 34 included those members of the sample with thick, dirty credit histories. The group 34 was also split based on bankcard utilization. The sixth segment 46 defined a sub-population with thick, dirty credit histories and a bankcard utilization of 40 percent or less. The sixth segment 46 included 13.4 percent of the sample and had a 5.1 percent bad account rate. The group 48 included those members of the total population 12 with thick, dirty credit histories and a bankcard utilization of 41 percent or greater. The group 48 was split further based on the time span of the credit histories. A seventh segment 50 included those members of the population 12 with thick, dirty credit files and bankcard utilization of 41 percent or higher with old credit histories. The seventh segment 50 included 4.6 percent of the sample and had a 9.5 percent bad account rate. The eighth segment 52 included those members of the total population 12 with thick, dirty credit histories and 41 percent or greater bankcard utilization with a new credit history. The eighth segment 52 included 6.2 percent of the sample and had a 12.8 percent bad account rate.

FIG. 4 shows a breakdown of the eight defined sub-populations with the number good and the number bad from the representative sample. A scorecard for each of the eight sub-populations was developed taking into account the likelihood an account would ever be 90 days or more past due. The scorecards were developed using the criteria validated with the sample population. Each scorecard was tailored to accurately analysis the members in the sub-population to which it pertained.

Next, the sample population was analyzed using the newly created scorecards. A test run of the system was conducted to indicate which of the sample population applications would be accepted and which would be rejected. The applications rejected were the ones that the scorecard indicated would likely be 90 days or more past due. The credit bureau files were then analyzed to determine the actual credit history of the sample population to determine the accuracy of the scorecards. FIG. 5 summarizes the credit bureau match rate for the sample population scored by the custom scorecards.

Figure 3A:
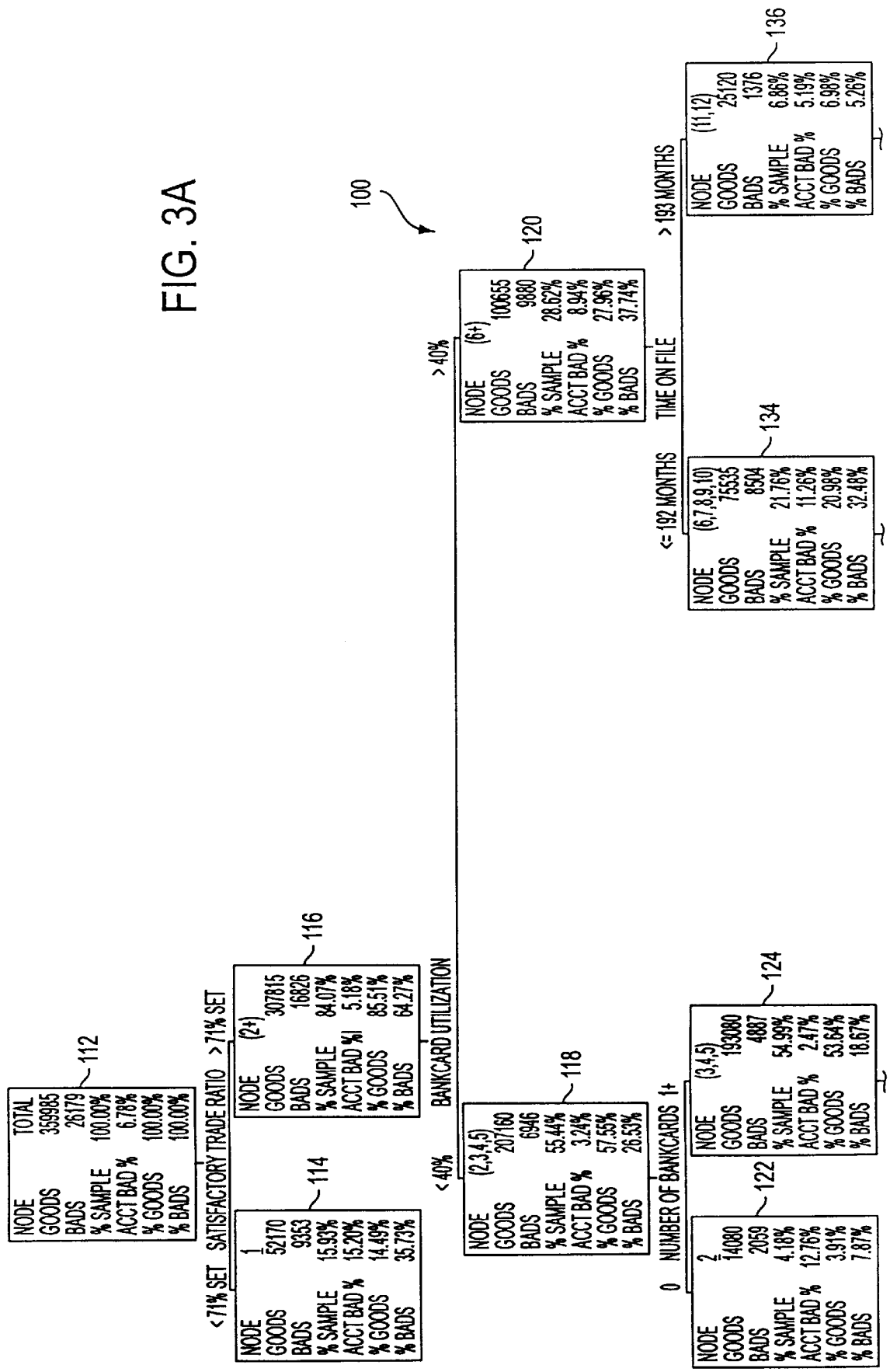
FIG. 3 illustrates a segmentation chart involving twelve nodes including sample data according to a second embodiment of the invention.
Figure 3B:
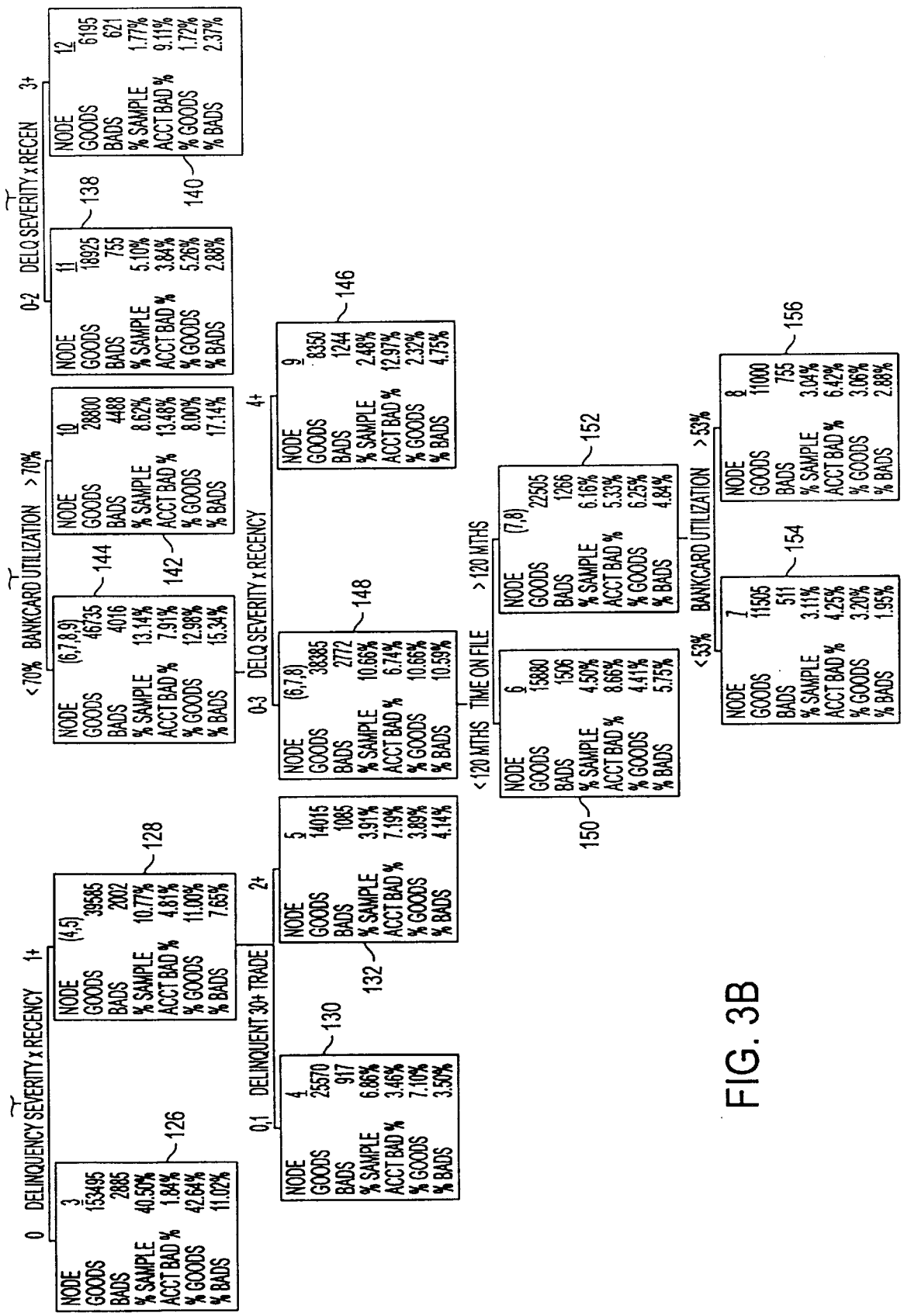

FIG. 3 illustrates a second embodiment according to the invention using a classification and regression tree (CART) 100 to break a total population 112 into sub-populations or nodes. The CART 100 includes 12 nodes. As the total population is divided, separate sub-populations or groups are defined. Each node defines a sub-population and each group is further divided by the CART 100.

The total population 112 is first split by determining whether the credit history has a satisfactory trade ratio. The first node 114 defines a sub-population with a less than 71 percent satisfactory trade ratio. The potion of the total population 112 with a greater than 71 percent satisfactory trade ratio are included in group 116. Group 116 is further broken down into two groups 118 and 120 based on bankcard utilization. Those members of group 116 with a bankcard utilization of less than 40 percent are included in group 118. Those members of group 116 with a bankcard utilization greater than 40 percent are included in group 120.

Group 118 is further divided based on the number of bankcards currently reported as active in the credit history. A second node 122 defines a sub-population with a greater than 71 percent satisfactory trade ratio, less than 40 percent bankcard utilization, and no currently active bankcards. The group 124 includes the remaining members of the group 118. The group 124 includes members of 118 with at least one currently active bankcard in their credit history. The group 124 is further divided based on the delinquency severity and recentness.

A third node 126 defines a sub-population with a greater than 71 percent trade ratio, less than 40 percent bankcard utilization, at least one currently active bankcard, and no severe or recent delinquencies. A group 128 includes the remainder of the group 124 which have one or more severe or recent delinquencies.

Group 128 is further divided based on the number of delinquencies for every 30 trades. A fourth node 130 defines a sub-population having a satisfactory trade ratio greater than 71 percent, less than 40 bankcard utilization, one or more currently active bankcards, at least one recent or severe delinquency, and one or less delinquency every 30 trades. A fifth node 132 defines a sub-population with a greater than 71 percent satisfactory trade ratio, less than 40 percent bankcard utilization, at least one currently active bankcard, one or more recent or severe delinquencies, and two or more delinquencies every 30 trades.

The group 120 includes the portion of the total population 112 that has a greater than 71 percent satisfactory trade ratio and a greater than 40 percent bankcard utilization. The group 120 is divided into two groups 134 and 136 based on the time span of the credit history. The group 134 includes those members of group 120 that have 192 or less months reported in their credit history. The group 136 includes members of the group 120 with 193 or more months reported in the credit history.

The group 136 is further divided based on the recentness and severity of delinquencies reported in the credit history. A sixth node 138 defines a sub-population with a greater than 71 percent satisfactory trade ratio, greater than 40 percent bankcard utilization, 193 or more months reported in the credit history, and a two or less severity index. A seventh node 140 defines a sub-population of the total population 112 with a greater than 71 percent satisfactory trade ratio, greater than 40 percent current utilization, 193 or more months reported in the credit history, and a severity index of more than two.

The group 134 is divided based on bankcard utilization. An eighth node 142 defines members of total population 112 with greater than 71 percent satisfactory trade ratio, greater than 40 percent bankcard utilization, 192 or less months reported in the history, and greater than 70 percent bankcard utilization. The group 144 includes those members of group 134 with less than 70 percent bankcard utilization. Therefore, group 144 is going to include credit histories with a bankcard utilization between 40 and 70 percent.

The group 144 is further divided based on the severity and recentness of delinquencies reported in the credit history. A ninth node defines a sub-population having a greater than 71 percent satisfactory trade ratio, greater than 40 percent bankcard utilization, less than 192 months reported, less than 70 percent bankcard utilization, and a severity index of more than three. A group 148 includes those members of the group 144 having a severity index of three or less.

The group 148 is divided further based on the timespan of the reported credit history. A tenth node 150 defines members of the total population 112 with a 71 percent or greater satisfactory trade ratio, a bankcard utilization between 40 and 70 percent, a severity index of three or less, and less than 120 months reported in the credit history. A group 152 includes the members of the group 148 with greater than 120 months reported in the credit history. The group 152 therefore includes members of the total population with a satisfactory trade ratio of greater than 71 percent, bankcard utilization between 40 and 70 percent, and a credit history greater than 120 months but 192 or less months reported.

The group 152 is split into an eleventh node 154 and a twelfth node 156. The eleventh node 154 includes members of the group 152 with a bankcard utilization between 40 and 63 percent. The twelfth node 156 includes members of the group 152 with a bankcard utilization greater than 63 percent but less than 70 percent.

Figure 6:
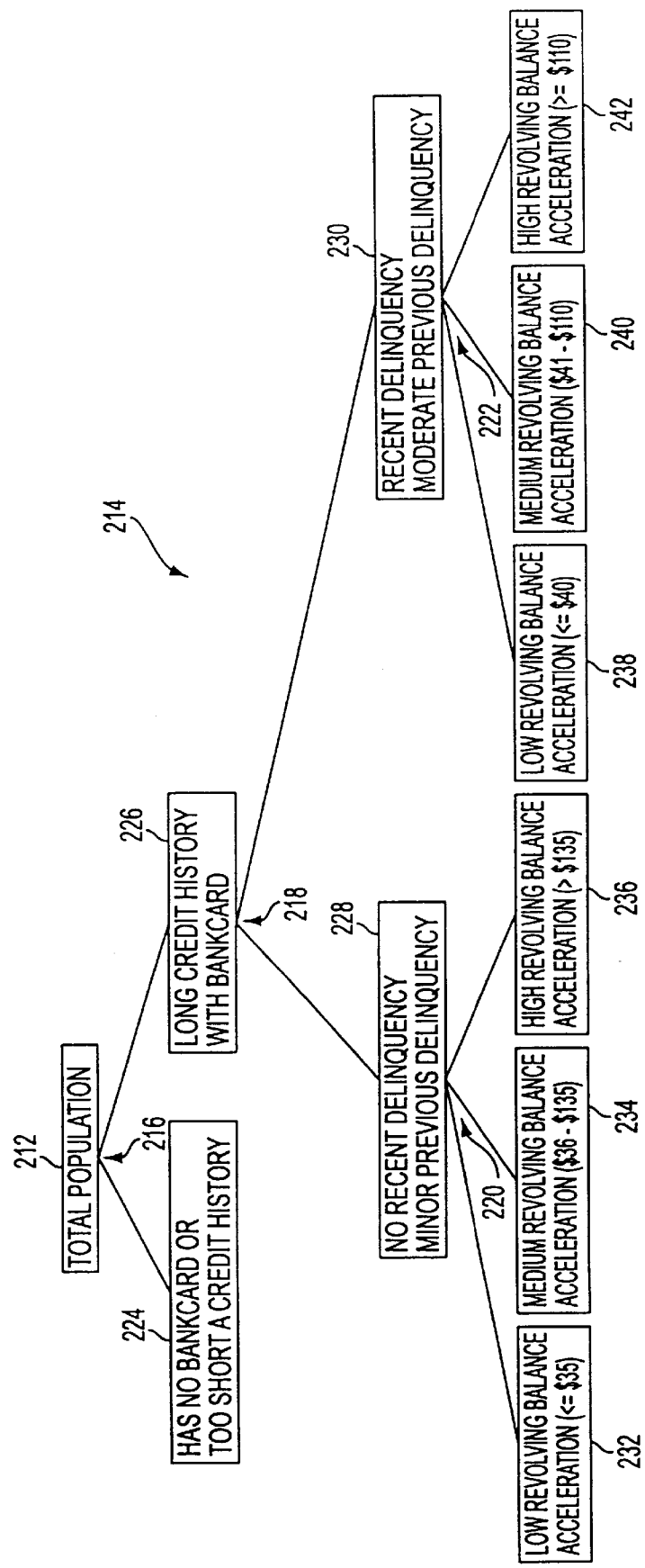
FIG. 6 illustrates a segmentation scheme according to a third embodiment of the invention.

FIG. 6 illustrates a segmentation tree 214 according to a third embodiment of the invention. The segmentation tree 214 breaks down a total population 212 into seven segments. The segments are generated based on three pieces of credit history information. The segmentation tree 214 includes a first branch 216, a second branch 218, a third branch 220, and a fourth branch 222.

The first branch 216 is developed using the amount of detail in the credit history. The first branch 216 creates two groupings, one group creates a first segment 224 and a second group 226 continues for further segmentation. The first segment 224 defines a sub-population that has a thin credit file. A thin credit file encompasses credit histories of people that have not had a bank card or too short of a credit history. An applicant with a thin file generally refers to an applicant with fewer than three trades. The group 226 includes credit histories with thick credit files. Thick credit files means the history has data on three or more trades.

The second branch 218 further segments group 226. The second branch 218 is developed using the delinquency reported in the credit history. The second branch 218 creates two groupings 228 and 230 which are segmented further by the segmentation tree 214. The group 228 includes credit histories with no recent delinquencies and only minor delinquencies in the entire history. Minor delinquencies are where the account was not 60 or more days delinquent. Recent delinquencies are ones that occurred within the last six months. The group 230 includes credit histories with recent and/or severe delinquencies. Applicants with no delinquencies or very old minor delinquencies are generally refereed to as having a clean credit history. Those with moderate or severe and recent delinquencies are generally referred to as having a dirty credit history. The severity index used to determine whether a credit history is clean or dirty is taken as a combination of severity and recentness of the delinquency. In one embodiment, a clean credit history would have a severity index value smaller than four.

The third branch 220 further segments group 228 based on the rate of accumulating revolving debt. The third branch 220 is developed using the revolving balance acceleration reported in the credit history. The third branch 220 creates three groupings. One grouping defines a second segment 232, one grouping defines a third segment 234, and another grouping defines a fourth segment 236. The second segment 232 defines a sub-population having credit histories with low revolving balance acceleration. Revolving balance acceleration is a dollar figure calculated by taking the total current revolving balance shown in a credit history and dividing that total by the number of months the credit history has been on file with the credit bureau. The low revolving balance acceleration for the second segment 232 is an acceleration of $35 or less. The third segment 234 defines a sub-population having credit histories with medium revolving balance acceleration. The medium acceleration of the third segment 234 is an acceleration of $36 to $135. The fourth segment 236 defines a sub-population having credit histories with high revolving balance acceleration. The high acceleration of the fourth segment 236 is an acceleration of greater than $135.

The fourth branch 222 further segments group 230. The fourth branch 222 is developed using the revolving balance acceleration reported in the credit history. The third branch 222 creates three groupings. One grouping defines a fifth segment 238, one grouping defines a sixth segment 240, and another grouping defines a seventh segment 242. The fifth segment 238 defines a sub-population having credit histories with low revolving balance acceleration. The low revolving balance acceleration for the fifth segment 238 is an acceleration of $40 or less. The sixth segment 240 defines a sub-population having credit histories with medium revolving balance acceleration. The medium acceleration of the sixth segment 240 is an acceleration of $40 to $110. The seventh segment 242 defines a sub-population having credit histories with high revolving balance acceleration. The high acceleration of the seventh segment 242 is an acceleration of greater than $110.

A separate scorecard is developed for each of the seven segments defined by the segmentation tree 214. Each scorecard can be developed to accurately score similarly situated applicants in each of the seven defined sub-populations. As can be seen in FIG. 6, each of the defined sub-populations has different characteristics. In addition, the criteria indicating whether an acceleration is low, medium, or high varies from sub-population to sub-population as shown by segments 232, 234, and 236 versus segments 238, 240, and 242.

Figure 7:
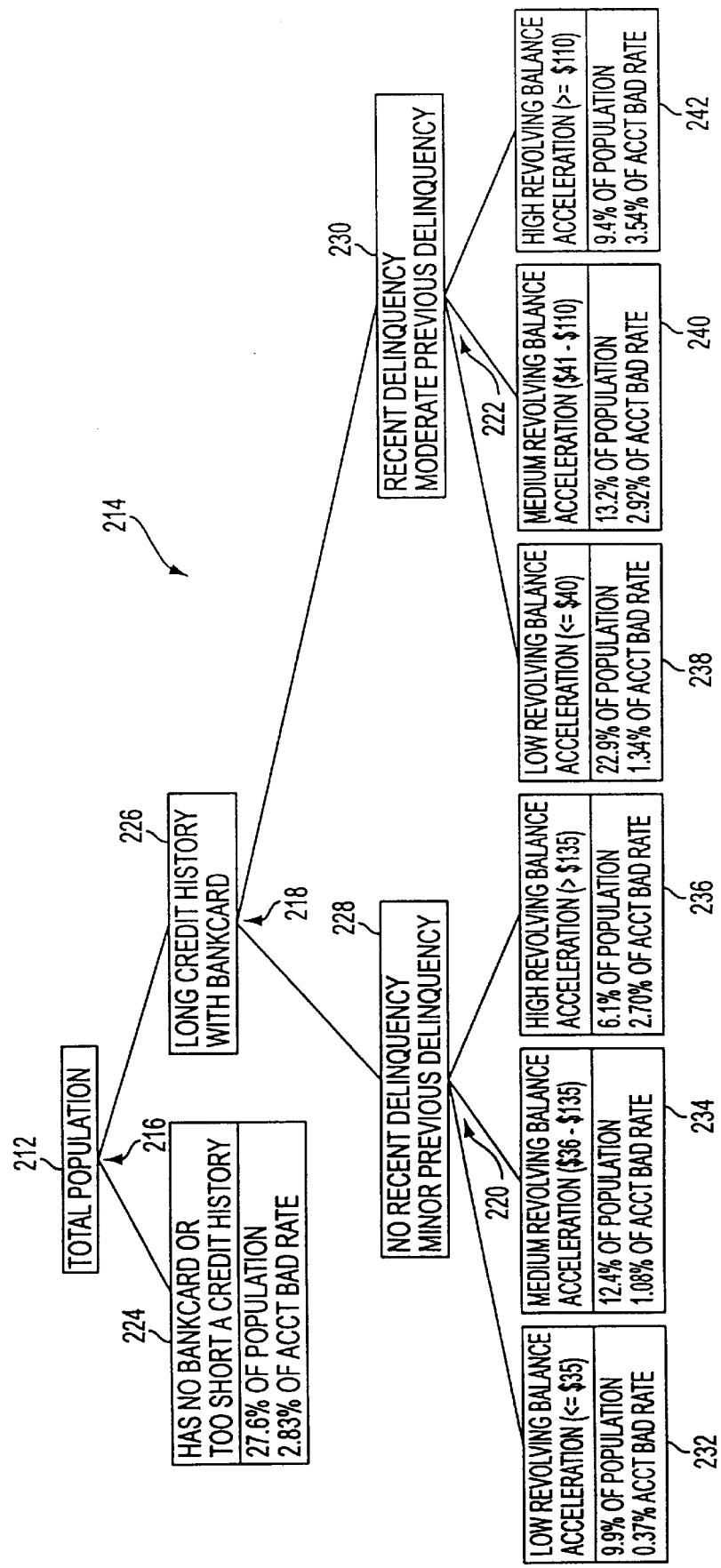
FIG. 7 illustrates a segmentation scheme according to the third embodiment of the invention with sub-population groupings for a representative sample.

A separate scorecard is developed for each of the seven segments defined by the segmentation tree 214. Each scorecard can be developed to accurately score similarly situated applicants in each of the seven defined sub-populations. As can be seen in FIG. 7, each of the defined sub-populations has a different bad account percentage. In addition, the criteria indicating whether an account is likely to become bad varies from sub-population to sub-population.

In order to test the validity of the defined sub-populations, a representative sample of past applicants were rescored with the new methodology and compared with their actual credit history. The goal was to estimate the probability that an account would be 90 or more days past due in the first two years. Bad accounts were defined as accounts that were 90 or more days past due and the rest were termed good. FIG. 7 shows the breakdown of the percentage of the sample with the percentage of accounts for each of the seven segments developed using the segmentation 214.

The total population 212 included 100 percent of the representative sample and was split into the first segment 224 and the group 226. The first segment 224 included the portion of the sample that had thin credit files or no bankcards. This represented 27.6 percent of the total sample and the sub-population defined by the segment 224 had a 2.83 percent bad account rate. The rest of the total population 212 with thick credit files including bankcards were placed in the group 226.

Those in group 226 were split next into the two groups 228 and 230. This split was based on the severity and recentness of any delinquencies. Group 228 included those applicants in the sample with thick credit files and no or old delinquencies (clean) in their file history. The group 230 included portions of the sample with thick credit files and moderate or recent delinquencies (dirty).

The portion of the total population 212 that fit into group 228 were further split based on revolving balance acceleration. The second segment 232 defined a sub-population of the sample with thick, clean credit files where the revolving balance acceleration was $35 or less. The sub-population defined by the second segment 232 included 9.9 percent of the representative sample and had a 0.37 percent bad account rate. The third segment 234 defined a sub-population with thick, clean credit histories and a revolving balance acceleration of $36 to $135. The sub-population defined by the third segment 234 included 12.4 percent of the sample and had a 1.08 percent bad account rate. The fourth segment 236 defined a sub-population with thick, clean credit histories and a revolving balance acceleration of more than $135. The sub-population defined by the fourth segment 236 included 6.1 percent of the sample and had a 2.70 percent bad account rate.

The portion of the total population 212 that fit into group 230 were further split based on revolving balance acceleration. The fifth segment 238 defined a sub-population of the sample with thick, dirty credit files where the revolving balance acceleration was $40 or less. The sub-population defined by the fifth segment 238 included 22.9 percent of the representative sample and had a 1.34 percent bad account rate. The sixth segment 240 defined a sub-population with thick, dirty credit histories and a revolving balance acceleration of $41 to $110. The sub-population defined by the sixth segment 240 included 13.2 percent of the sample and had a 2.92 percent bad account rate. The seventh segment 242 defined a sub-population with thick, dirty credit histories and a revolving balance acceleration of more than $110. The sub-population defined by the seventh segment 242 included 9.4 percent of the sample and had a 3.54 percent bad account rate.

While we have illustrated and described preferred embodiments of my invention, it is understood that they are capable of modification and we therefore do not wish to be limited to the precise details set forth, but desire to avow myself of such changes and alterations as fall within the purview of the following claims.

What we claim as our invention is:

1. A computer implemented method for evaluating credit risk of bank card applicants comprising the steps of:
    a) dividing a population of bank card applicants into a plurality of sub-populations using a processing unit, based on a first factor selected from a factor group consisting of length of credit history, number of reported trades, reported delinquency, bank card utilization, and revolving balance acceleration;
    b) dividing at least one of said sub-populations into additional sub-populations based on a second factor selected from the factor group, the second factor being different from the first factor selected from the factor group;
    c) developing a scorecard for each of said plurality of sub-populations and additional sub-populations;
    d) applying one of said scorecards to a bank card application; and
    e) scoring said application, based on said applied scorecard.

2. The method of claim 1 wherein the step of dividing includes dividing said population of bank card applicants into a first sub-population and a second sub-population, said first sub-population includes applicants with fewer than 3 trades and said second sub-population includes applicants with more than 2 trades.

3. The method of claim 2 wherein the step of dividing includes dividing said second sub-population into a third sub-population and a fourth sub-population, said third sub-population includes applicants with no reported delinquencies in a preceding six month period and applicants with delinquencies of less than 60 days, said fourth sub-population includes applicants with reported delinquencies within a preceding six month period and applicants with reported delinquencies of more than 60 days.

4. The method of claim 2 wherein the step of dividing includes dividing said third sub-population into a fifth sub-population, a sixth sub-population, and a seventh sub-population;
    said fifth sub-population includes applicants with less than 25% bank card utilization;
    said sixth sub-population includes applicants with 25% to 75% bank card utilization; and
    said seventh sub-population includes applicants with more than 75% bank card utilization.

5. The method of claim 1 wherein said score is based on at least one of each applicant's reported trades, reported delinquency, bank card utilization, and length of credit history.

6. The method of claim 4 wherein the step of dividing includes dividing said fourth-sub-population into an eight sub-population and a ninth sub-population, said eighth sub-population includes applicants with less than 40% bank card utilization and said ninth sub-population includes applicants with more than 40% bank card utilization.

7. The method of claim 6 wherein the step of dividing includes dividing said seventh sub-population into a tenth sub-population and an eleventh sub-population, said tenth sub-population includes applicants with more than 10 years of credit history and said eleventh sub-population includes applicants with less than 10 years of credit history.

8. The method of claim 7 wherein the step of dividing includes dividing said ninth sub-population and a thirteenth sub-population; said twelfth sub-population includes applicants with more than 10 years of credit history and said thirteenth sub-population includes applicants with less than 10 years of credit history.

9. The method of claim 3 wherein the step of dividing includes dividing said third sub-population into a fifth sub-population, a sixth sub-population, and a seventh sub-population;
    said fifth sub-population includes applicants with less than $35 of balance acceleration;
    said sixth sub-population includes applicants with between $35 and $135 of balance acceleration; and
    said seventh sub-population includes applicants with more than $135 of balance acceleration.

10. The method of claim 9 wherein the step of dividing includes dividing said fourth sub-population into an eighth sub-population, a ninth sub-population, and a tenth sub-population;
    said eighth sub-population, includes applicants with less than $40 of balance acceleration;
    said ninth sub-population includes applicants with between $40 and $110 of balance acceleration; and
    said tenth sub-population includes applicants with more than $110 of balance acceleration.

* * * * *